United States Patent
Wang et al.

(10) Patent No.: US 10,854,865 B2
(45) Date of Patent: Dec. 1, 2020

(54) ELECTRIFIED VEHICLE BUSBAR SECURED USING A DEFORMED AREA OF AN ATTACHMENT STRUCTURE

(71) Applicant: Ford Global Technologies, LLC, Dearborn, MI (US)

(72) Inventors: Yongcai Wang, Ann Arbor, MI (US);
Yunan Guo, Rochester Hills, MI (US);
Jingmei Shen, Troy, MI (US);
Ahteram Khan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 16/211,595

(22) Filed: Dec. 6, 2018

(65) Prior Publication Data
US 2020/0185684 A1 Jun. 11, 2020

(51) Int. Cl.
*H01M 2/20* (2006.01)
*H01R 25/16* (2006.01)

(52) U.S. Cl.
CPC .......... *H01M 2/206* (2013.01); *H01R 25/162* (2013.01); *H01M 2220/20* (2013.01)

(58) Field of Classification Search
None
See application file for complete search history.

(56) References Cited

U.S. PATENT DOCUMENTS

| 4,659,169 A * | 4/1987 | Ustin | H01R 9/24 439/715 |
| 4,831,240 A * | 5/1989 | Davis | H01R 4/06 174/94 R |
| 4,977,309 A * | 12/1990 | Uchida | H01C 1/028 219/541 |
| 8,038,487 B2 | 10/2011 | Tsuchiya et al. | |
| 8,586,230 B2 | 11/2013 | Kim et al. | |
| 2002/0013099 A1* | 1/2002 | Adkins | H01R 13/20 439/625 |
| 2006/0088761 A1 | 4/2006 | Ota et al. | |
| 2010/0068948 A1* | 3/2010 | Weber | H01R 4/36 439/801 |
| 2011/0104456 A1 | 5/2011 | Byun et al. | |
| 2012/0212232 A1* | 8/2012 | Ikeda | H01M 2/206 324/426 |
| 2013/0071728 A1* | 3/2013 | Shibanuma | H01M 2/06 429/179 |
| 2013/0252486 A1* | 9/2013 | Kosyanchuk | H01R 4/304 439/813 |

(Continued)

OTHER PUBLICATIONS

Gensco Equipment Portable Bus Bar Tools, retrieved from https://www.genscoequip.com/portable-bus-bar-tools on Oct. 31, 2018.

*Primary Examiner* — Scott J. Chmielecki
(74) *Attorney, Agent, or Firm* — David Kelley, Esq.; Carlson, Gaskey & Olds, P.C.

(57) ABSTRACT

A busbar assembly includes, among other things, a busbar, a battery terminal, and a deformed area securing together the busbar and the battery terminal. A securing method includes, among other things, positioning a first portion of an attachment structure within an aperture, deforming a second portion of the attachment structure to provide a deformed area, and using the deformed area to secure a busbar relative to a battery terminal.

20 Claims, 5 Drawing Sheets

(56) References Cited

U.S. PATENT DOCUMENTS

| | | | |
|---|---|---|---|
| 2013/0337306 A1* | 12/2013 | Han | H01M 2/1016 |
| | | | 429/99 |
| 2014/0004408 A1* | 1/2014 | Ehara | H01M 2/22 |
| | | | 429/179 |
| 2015/0072222 A1* | 3/2015 | Byun | H01M 2/06 |
| | | | 429/180 |
| 2015/0072570 A1* | 3/2015 | Dods | H01R 13/642 |
| | | | 439/752 |
| 2015/0214530 A1* | 7/2015 | Lee | H01M 2/206 |
| | | | 429/158 |
| 2015/0288159 A1* | 10/2015 | Chorian | H02G 5/025 |
| | | | 174/70 B |
| 2017/0025661 A1 | 1/2017 | Gibeau et al. | |
| 2017/0125956 A1* | 5/2017 | Kato | H01M 2/206 |
| 2017/0133655 A1* | 5/2017 | Guen | H01M 2/06 |
| 2018/0175362 A1 | 6/2018 | Hara | |
| 2019/0109315 A1* | 4/2019 | Hagino | H01M 2/0277 |
| 2019/0296407 A1* | 9/2019 | Newman | H01M 10/63 |

* cited by examiner

ELECTRIFIED VEHICLE BUSBAR SECURED USING A DEFORMED AREA OF AN ATTACHMENT STRUCTURE

TECHNICAL FIELD

This disclosure relates generally to securing a busbar and, more particularly, to securing the busbar using a deformed area of an attachment structure.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include a plurality of battery cell assemblies arranged in one or more battery arrays. Busbars can be used to distribute electrical energy to and from the battery cell assemblies, and to and from the battery pack. Busbars are typically secured using welds or mechanical fasteners.

SUMMARY

A busbar assembly, according to an exemplary aspect of the present disclosure includes, among other things, a busbar, a battery terminal, and a deformed area securing together the busbar and the battery terminal.

A further non-limiting embodiment of the foregoing assembly includes an attachment structure extending from the busbar or the battery terminal. The attachment structure includes the deformed area.

In a further non-limiting embodiment of the foregoing assembly, the attachment structure extends axially from the battery terminal through an aperture in the busbar.

In a further non-limiting embodiment of the foregoing assembly, the attachment structure includes an array of fins and a collar. The array of fins and the collar are circumferentially distributed about an axis.

In a further non-limiting embodiment of the foregoing assembly, the array of fins are bent radially outward relative to the axis such that the array of fins are bent over the busbar to limit movement of the busbar relative to the battery terminal.

In a further non-limiting embodiment of the foregoing assembly, the deformed area and the battery terminal are part of a singular, monolithic structure.

In a further non-limiting embodiment of the foregoing assembly, the deformed area is secured directly to the battery terminal.

In a further non-limiting embodiment of the foregoing assembly, the battery terminal is a first battery terminal and the deformed area is a first deformed area. The assembly further includes a second deformed area securing the busbar to a second battery terminal.

In a further non-limiting embodiment of the foregoing assembly, the busbar is secured relative to the first and second terminals without a weld or a mechanical fastener.

A further non-limiting embodiment of the foregoing assembly includes a battery pack of an electrified vehicle. The electrified vehicle includes the battery terminal, the busbar, and the deformed area.

A securing method, according to another exemplary aspect of the present disclosure includes, among other things, positioning a first portion of an attachment structure within an aperture, deforming a second portion of the attachment structure to provide a deformed area, and using the deformed area to secure a busbar relative to a battery terminal.

In another example of the foregoing method, the attachment structure extends from one of the busbar or the battery terminal, through an aperture in the other one of the busbar or the battery terminal.

In another example of any of the foregoing methods, the first portion of the attachment structure is an array of fins and the second portion of the attachment structure is a collar. The array of fins and the collar are circumferentially distributed about an axis.

Another example of the foregoing method includes deforming by bending at least a portion of the array of fins radially outward.

In another example of the foregoing method, the attachment structure extends from the battery terminal and the busbar provides the aperture.

In another example of the foregoing method, the busbar is held between the battery terminal and the deformed area.

In another example of the foregoing method, the attachment structure and the battery terminal are formed together as a single monolithic component.

Another example of the foregoing method includes pressing a punch relative to the attachment structure to provide the deformed area.

In another example of the foregoing method, the attachment structure includes an array of fins circumferentially distributed about an axis. The method further includes bending the array of fins by forcing the punch against the array of fins during the pressing.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a busbar assembly that includes a busbar secured to a component, such as a battery terminal. A deformed area is used to secure the busbar to the component.

Figure 1:
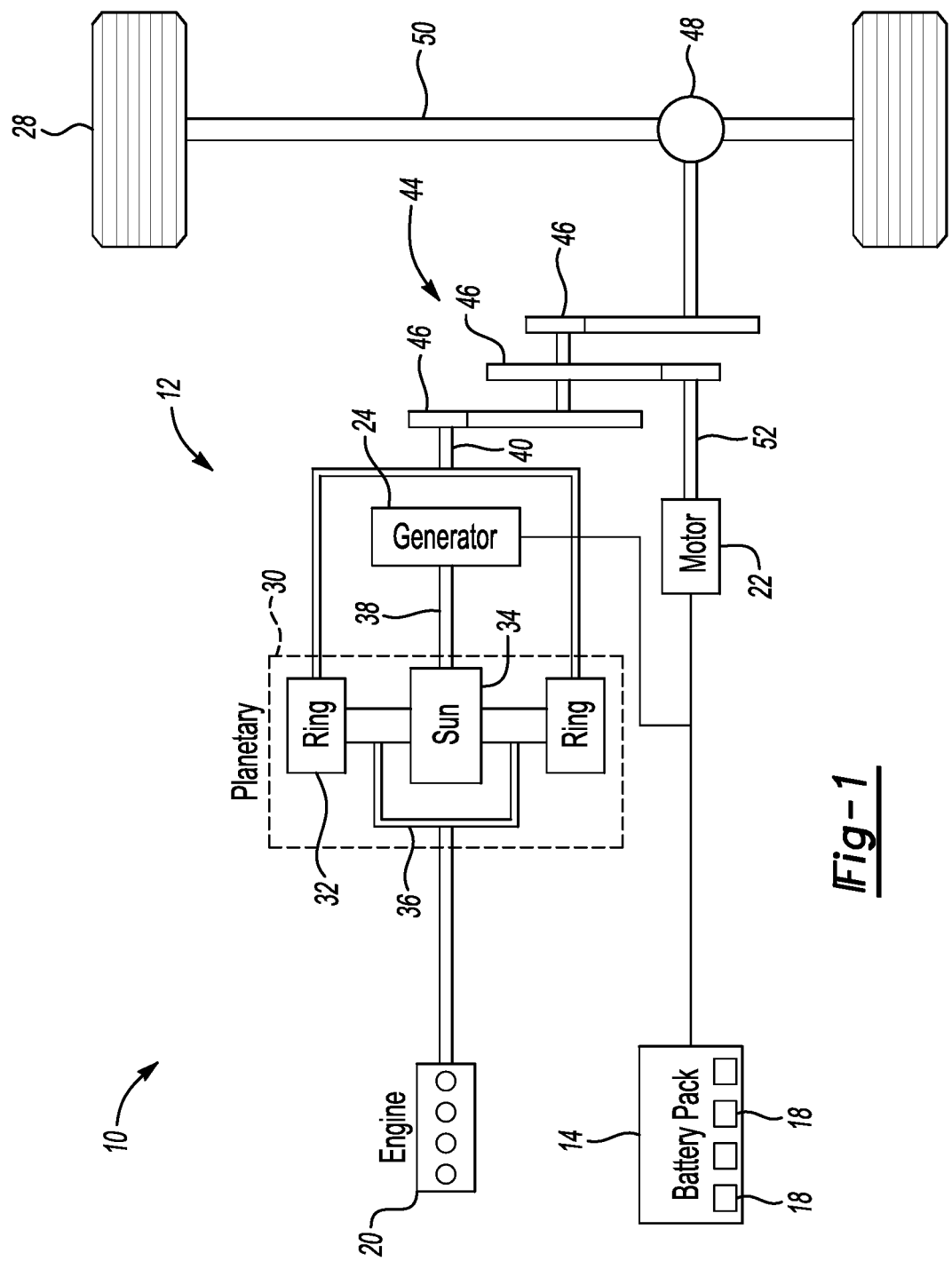
FIG. 1 illustrates a schematic view of an example powertrain of an electrified vehicle.

Referring to FIG. 1, a powertrain 10 of a hybrid electric vehicle (HEV) includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

The battery pack 14 with the battery arrays 18 can be a high-voltage battery pack, relative to an accessory battery, for example. The battery pack 14 is capable of outputting electrical power to operate the electric machine 14 and/or other electrical loads of the electrified vehicle 12. Since the battery pack 14 can provide power to power propulsion of a vehicle, the battery pack 14 can be considered a traction battery.

Figure 2:
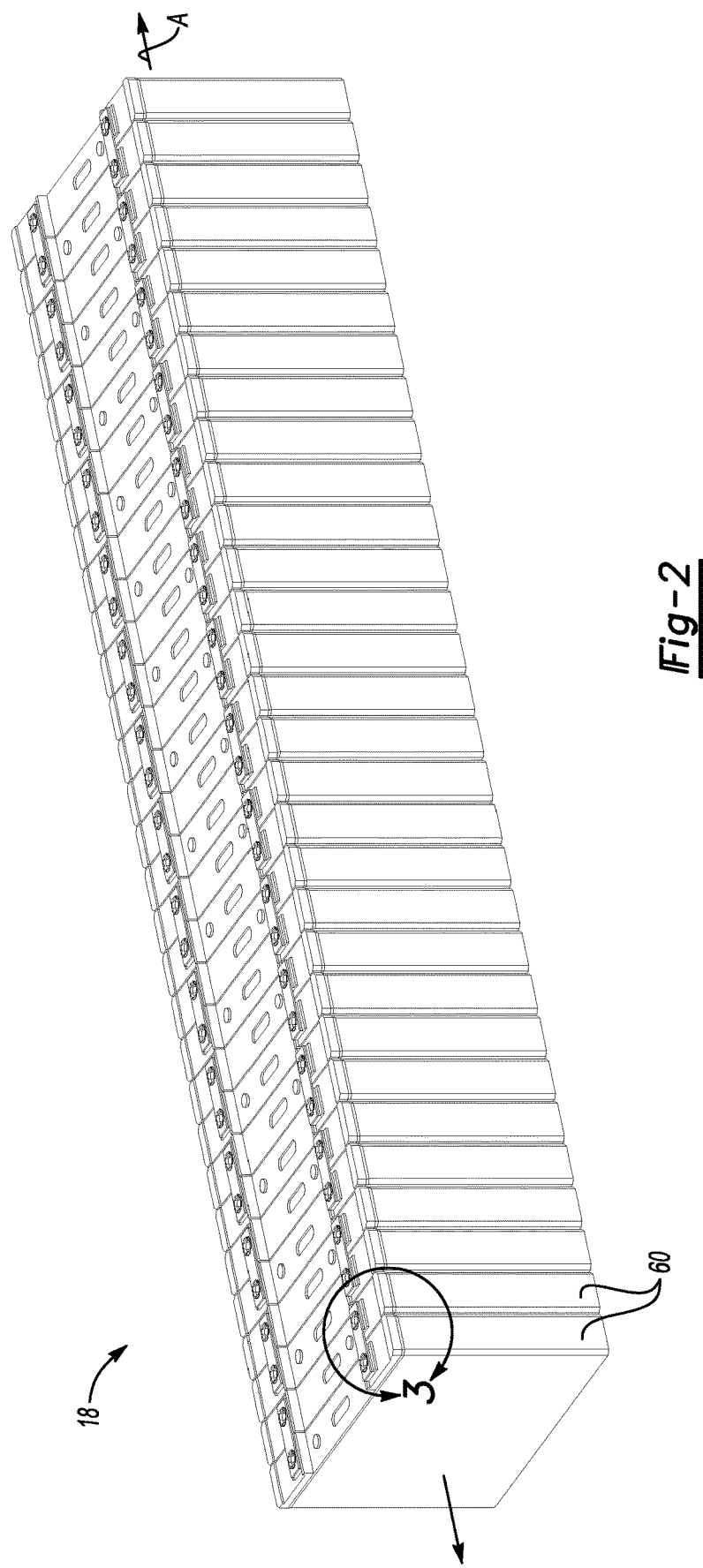
FIG. 2 illustrates a perspective view of battery arrays from the battery pack in the powertrain of FIG. 1.
Figure 3:
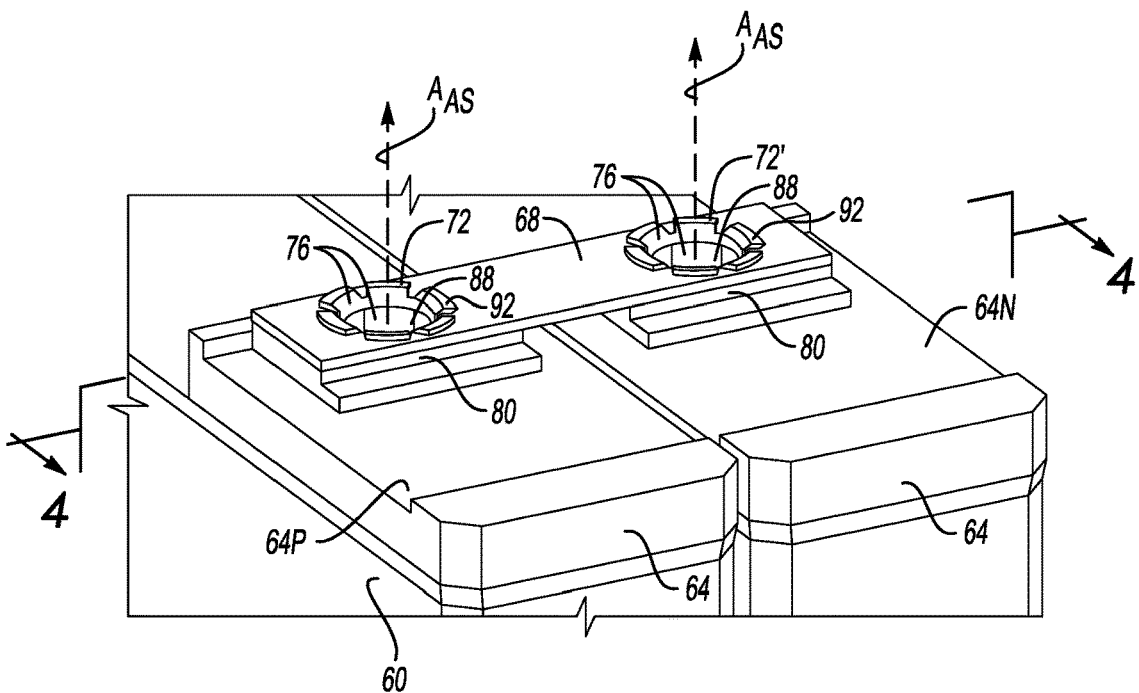
FIG. 3 illustrates a close-up view of a busbar secured to the terminals of axially adjacent battery cells within the battery pack of FIG. 2.
Figure 4:
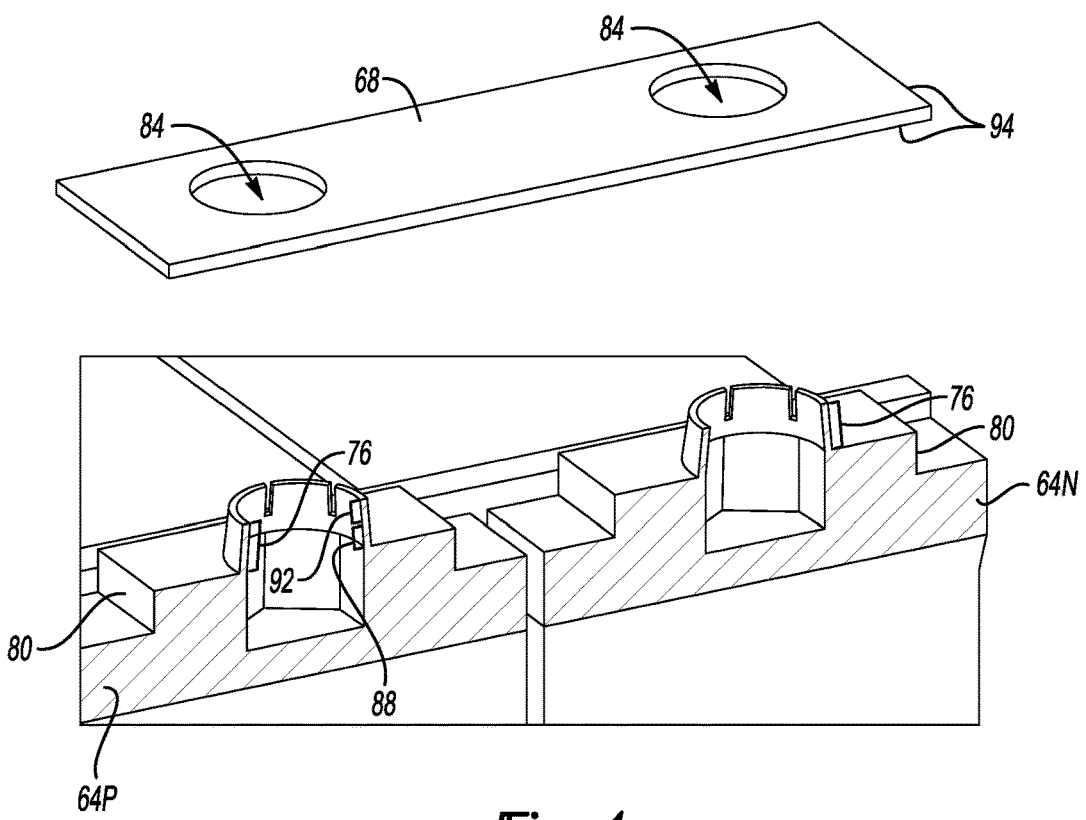
FIG. 4 illustrates a section view taken at line 4-4 in FIG. 3 prior to securing the busbar to the terminals.

Referring now to FIG. 2-4 with continuing reference to FIG. 1, the battery arrays 18 of the battery pack 14 can each include a plurality of battery cells 60 distributed along an axis A. Prismatic battery cells are shown in the exemplary, non-limiting embodiment. Other embodiments could use other types of battery cells, such as cylindrical battery cells.

The battery cells 60 each include terminals 64. In the exemplary, non-limiting embodiment, the battery cells 60 each include a positive terminal 64P that is aluminum, and a negative terminal 64N that is copper. Terminals 64 could be provided by metals and metal alloys other than aluminum and copper could be used in other examples.

The battery array 18 includes a plurality of busbars 68. Each busbar 68 electrically couples the terminal 64 of one of the battery cells 60 to the terminal 64 of an axially adjacent battery cell 60. The busbar 68 can be aluminum or copper, or some other metal or metal alloy.

A deformed area 72 is used to secure the busbar 68 to one of the terminals 64P. Another deformed area 72' is used to secure the busbar 68 to another of the terminals 64N.

In the exemplary, non-limiting embodiment, each terminal 64 includes an attachment structure 76. The attachment structure 76 extends from a primary portion 80 of the terminal 64 through an aperture 84 in the busbar 68. The attachment structure 76 includes a collar 88 and an array of fins 92. The collar 88 and the array of fins 92 are, generally, circumferentially distributed about an axis $A_{AS°}$. Prior to being deformed, the array of fins 92 and the collar 88 have a crown shape.

When the busbar 68 is in a secured position, as shown in FIG. 3, the collar 88 is disposed within the aperture 84 of the busbar 68. The aperture 84, in the exemplary embodiment, has a circumferentially continuous perimeter provide by the busbar 68 as shown in FIG. 4. The aperture 84, however, is not limited to such configurations. The aperture 84 could be a slot, for example, that opens to a side 94 of the busbar 68.

Additionally, when the busbar 68 is in the secured position, the fins 92 are bent radially outward relative to the axis $A_F$ such the fins 92 are bent over the busbar 68. The fins 92, when bend, sandwich the busbar 68 between the fins 92 and the primary portion 80 of the terminal 64. The sandwiching of the busbar 68 secures the busbar 68 relative to the respective terminal 64. The sandwiching of the busbar 68 can have similarities to a riveted joint, yet no separate rivet is required.

In this example, the attachment structure 76 is formed together with the respective terminal 64 such that the attachment structure 76 and the primary portion 80 are a singular, monolithic structure. In another examples, the attachment structure 76 could be formed separately from the primary portion 80, and then secured directly to the primary portion 80 prior to being received within the aperture 84. Welds, for example, could be used to secure together the attachment structure 76 and the primary portion 80.

In the exemplary embodiment, the deformed area 72 is provided by the array of fins 92, which are part of the attachment structure 76 extending from the terminal 64. In another example, the deformed area 72 could be part of an attachment structure that extends from the busbar 68. For example, an attachment structure extending from the busbar 68 could include a plurality of fins that are bent over a portion of the terminal 64 to secure together the busbar 68 and the terminal 64.

In other examples, the array of fins 92 could be omitted and the deformed area 72 provided by an attachment structure having a different configuration. For example, a portion of the collar 88 could extend through and past the aperture 84. That portion of the collar 88 could then be deformed radially outward to provide the deformed portion of the attachment structure 76.

Referring now to FIG. 4-7, a securing method is used to secure the busbar 68 relative to the terminals 64P, 64N. The method first moves the busbar 68 from the position of FIG.

Figure 5:
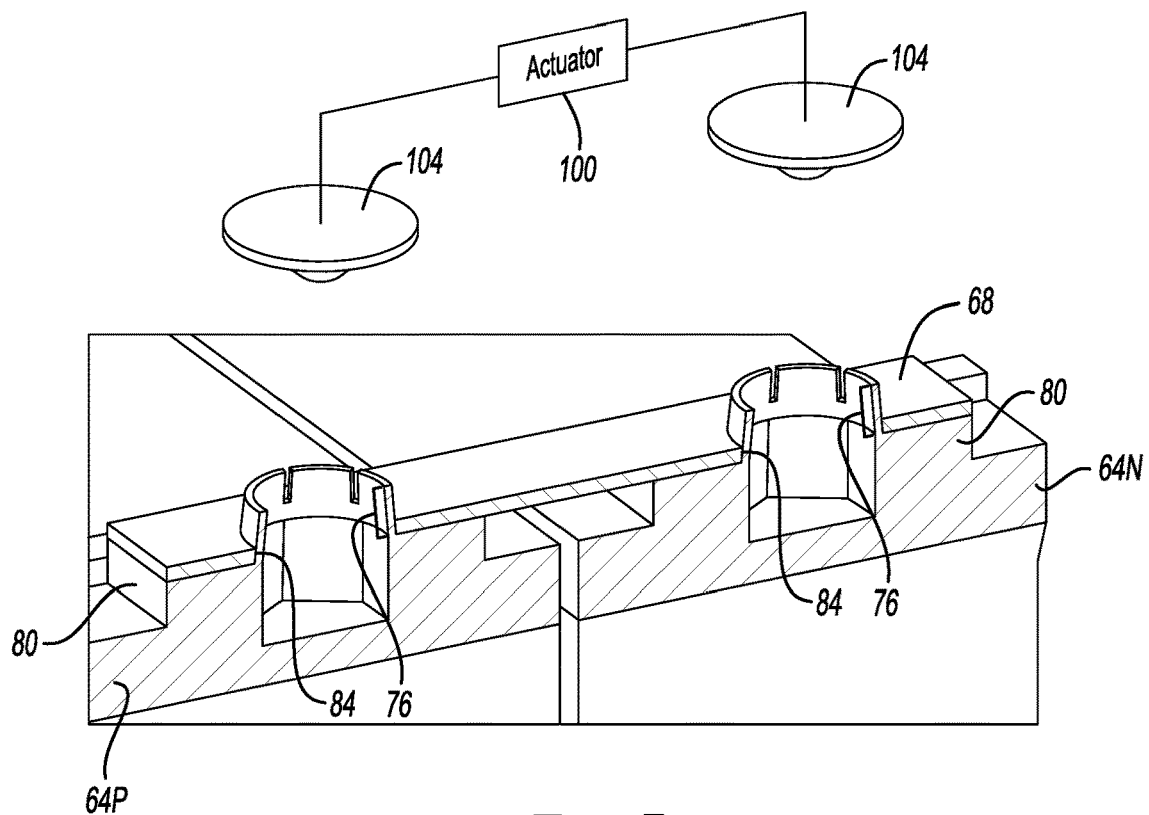
FIG. 5 illustrates the section view of FIG. 4 at a step in a securing method used to secure the busbar to the terminals.
Figure 6:
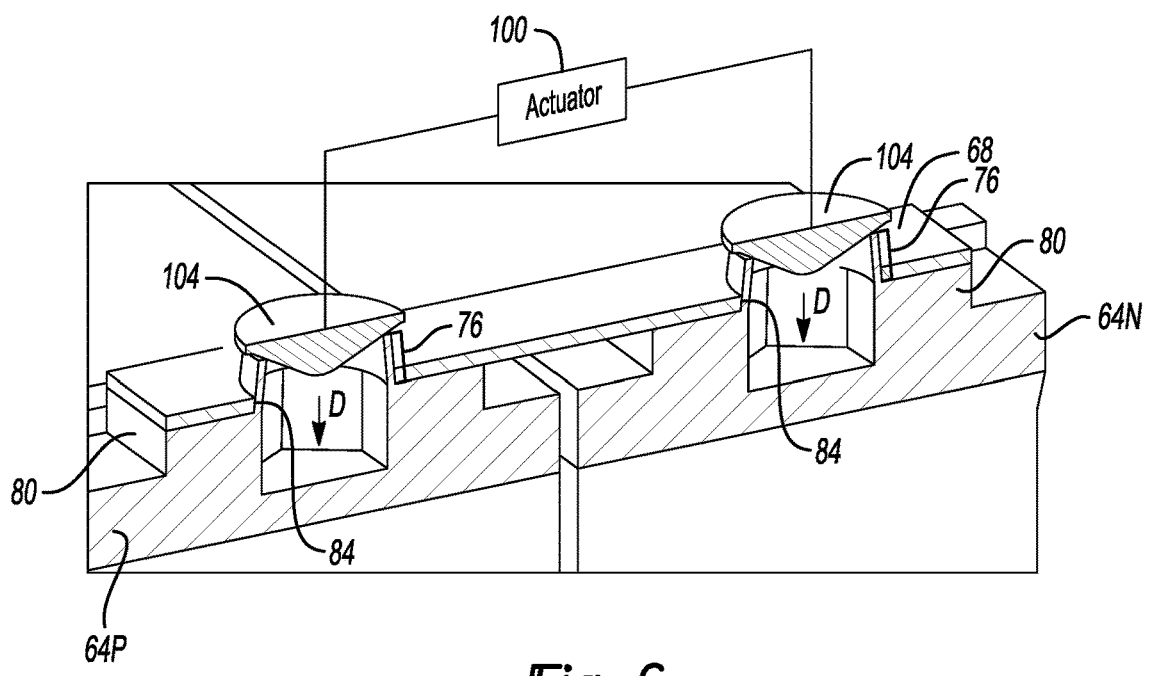
FIG. 6 illustrates the section view of FIG. 4 at a step in the securing method that is after the step of FIG. 5.
Figure 7:
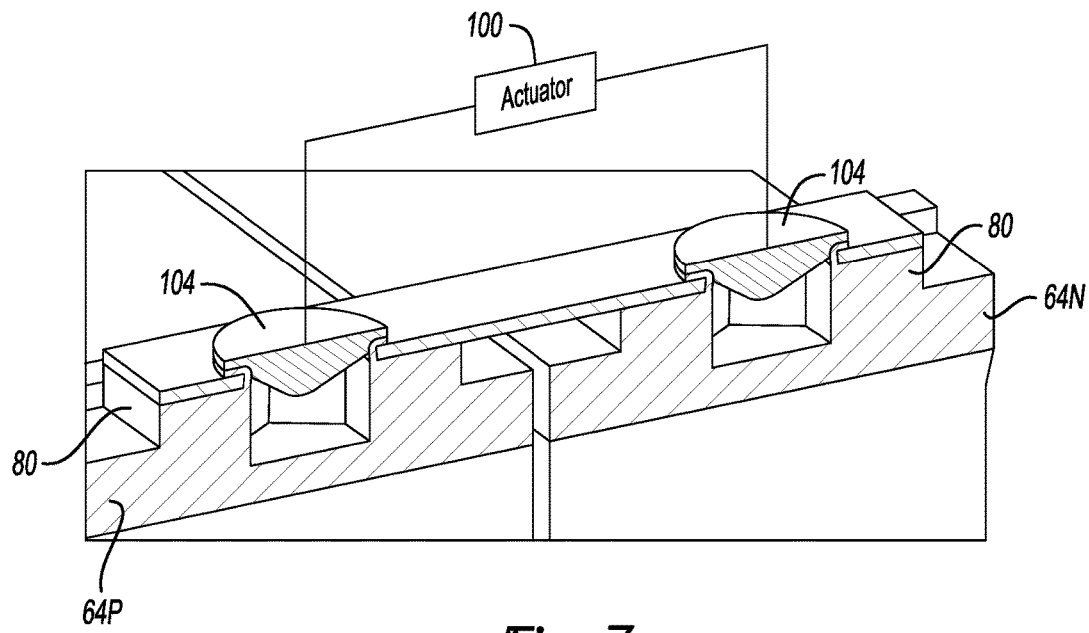
FIG. 7 illustrates the section view of FIG. 4 after using the securing method to secure the busbar to the terminals FIG. 8 schematically illustrates an electronic distribution system used in the powertrain of FIG. 1.
Figure 8:
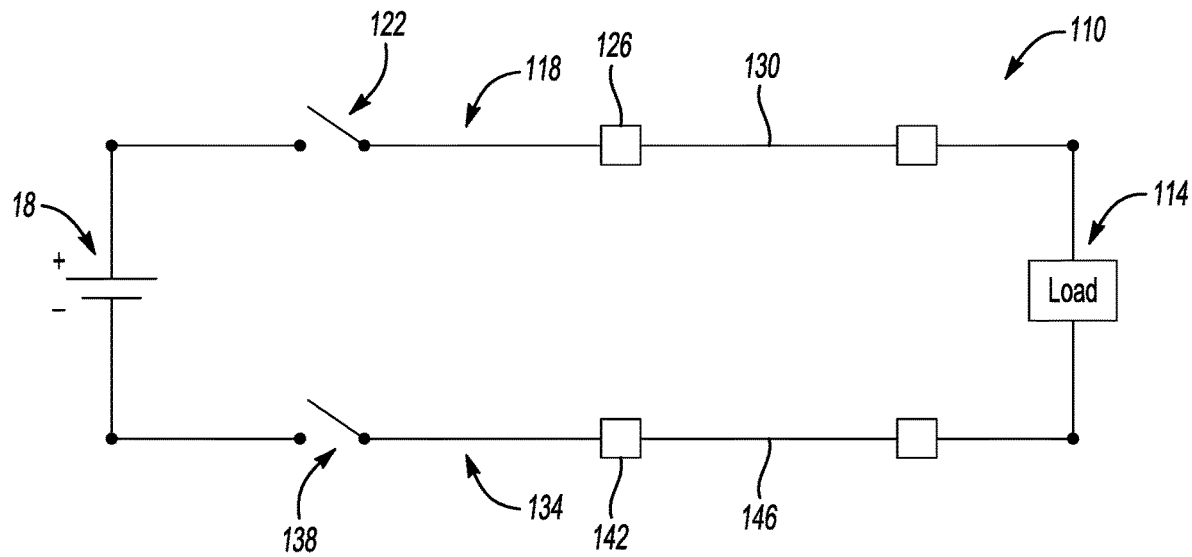

4 to the position of FIG. 5, which places the attachment structures 76 within respective apertures 84 of the busbar 68. Next, an actuator 100 is used to move punches 104 relative to the fins from the position of FIG. 5 to the position of FIG. 6. The punches 104 are dome-shaped in this example. Continuing to move the punches 104 against the against the fins 92 in a direction D forces the fins 92 to move radially outward relative to the axis $A_F$ and bend over the busbar 68 as shown in FIG. 7. The actuator 100 withdraws the punches 104 away from the fins 92. The example busbar 68 is then secured relative to the terminals 64P, 64N without a weld or a mechanical fastener as shown in FIG. 8.

The actuator 100 can be, for example, a hydraulic actuator. A person having skill in this art and the benefit of this disclosure could understand other types of actuators suitable for moving the punches 104 back-and-forth between the positions of FIGS. 5, 6, and 7.

Although the busbar 68 is described as electrically coupling together the terminals 64 of axially adjacent battery cells 60, the busbar 68 could instead be used to electrically couple together other components. For example, FIG. 8 schematically illustrates an electric distribution system 110 of the powertrain 10 of FIG. 1. The electric distribution system 110 distributes electrical energy between the battery arrays 18 and a load 114, such as the motor 22.

The busbar 68 could be used at position 118 to electrically couple together a first component 122 and a second component 126. In this example, the first component 122 is a relay, and the second component 126 is a connector, such as a connector to a wiring harness 130. The busbar 68 could be used at position 134 to instead, or additionally, electrically couple together a third component 138 and a fourth component 142. In this example, the third component 138 is a relay, and the fourth component 142 is a connector, such as a connector to a wiring harness 146.

The busbar 68 could be used in other areas of the system 110 to electrically couple together components, such as the wiring harness 130 and the load 114, or the first component 122 and the battery arrays 18. The busbar 68 could also be used elsewhere within the powertrain 10, in another portion of the vehicle incorporating the powertrain 10, or for some other application.

The busbar 68 secured with the deformed area 72 should thus not be construed as limited to busbars electrically coupling arrays 18 as shown in FIG. 2, or as electrically coupling the structures shown in the system 110 of FIG. 8. The busbar 68 can be used to electrically couple together various components.

Features of the disclosed examples include providing busbar secured with a deformed area of an attachment structure. Some of the exemplary securing techniques do not require a thermal energy input due to welding, which can eliminate weld defects such as intermetallic, brittleness, porosity, and cracks. Further, a separate mechanical fastener, such as a bolt can be omitted, which can reduce overall complexity. The exemplary securing techniques also have a relatively low profile relative to, for example, a separate mechanical fastener. The relatively low profile can be advantageous from a packaging perspective.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   a busbar;
   a battery terminal;
   a deformed area securing together the busbar and the battery terminal; and
   an attachment structure extending from the busbar or the battery terminal, the attachment structure including the deformed area, wherein the attachment structure includes array of fins and a collar, the array of fins and the collar circumferentially distributed about an axis.

2. The busbar assembly of claim 1, wherein the attachment structure extends from the battery terminal through an aperture in the busbar.

3. The busbar assembly of claim 1, wherein the array of fins are bent radially outward relative to the axis such that the array of fins are bent over the busbar to limit movement of the busbar relative to the battery terminal.

4. The busbar assembly of claim 1, wherein the deformed area and the battery terminal are part of a singular, monolithic structure.

5. The busbar assembly of claim 1, wherein the deformed area is secured directly to the battery terminal.

6. The busbar assembly of claim 1, wherein the battery terminal is a first battery terminal and the deformed area is a first deformed area, and further comprising a second deformed area securing the busbar to a second battery terminal.

7. The busbar assembly of claim 6, wherein the busbar is secured relative to the first and second terminals without a weld or a mechanical fastener.

8. The busbar assembly of claim 1, further comprising a battery pack of an electrified vehicle having the battery terminal, the busbar, and the deformed area.

9. The busbar assembly of claim 1, wherein the array of fins and the battery terminal are part of a single, monolithic structure.

10. The busbar assembly of claim 1, wherein the busbar and the battery terminal are secured together without any thermal energy input.

11. The busbar assembly of claim 1, wherein the busbar and the battery terminal are secured together without any welds.

12. The busbar assembly of claim 1, wherein the terminal is aluminum and the busbar is copper.

13. The busbar assembly of claim 1 wherein the busbar and the battery terminal are mechanically joined.

14. The busbar assembly of claim 13, wherein no portion of the busbar is fusion joined to the terminal.

15. The busbar assembly of claim 1, wherein the array of fins includes a plurality of individual fins that are each circumferentially spaced a distance from one another.

16. The busbar assembly of claim 15, wherein the individual fins are circumferentially spaced to provide a gap between each of the individual fins.

17. The busbar assembly of claim 3, wherein the axis extends through a battery cell having the battery terminal.

18. A battery assembly, comprising:
    a battery cell;
    a battery terminal of the battery cell;
    a busbar; and
    an attachment structure including a collar and an array of fins circumferentially disposed about an axis, the collar of the attachment structure extending from the terminal away from the battery cell, the collar at least partially disposed within an aperture of the busbar, the array of fins folded against a surface of the busbar.

19. The battery assembly of claim 18, wherein the surface of the busbar is a first surface facing in a first direction away from the battery cell, wherein the busbar includes an opposite second surface that faces in an opposite second direction toward the battery cell.

20. The busbar assembly of claim 18, wherein the axis extends through a battery cell having the battery terminal.

\* \* \* \* \*